United States Patent Office.

JOSEPH HECKEL, OF DECATUR, ILLINOIS.

Letters Patent No. 71,752, dated December 3, 1867.

---

IMPROVED COMPOSITION FOR COATING WOODEN STRUCTURES.

---

The Schedule referred to in these Letters Patent and making part of the same.

---

TO ALL WHOM IT MAY CONCERN:

Be it known that I, JOSEPH HECKEL, of Decatur, in the county of Macon, and State of Illinois, have invented a new and useful Improved Composition for Covering Wooden Buildings, Bridges, etc.; and I do hereby declare the following to be a full, clear, and exact description of the same.

The composition which is the subject of this invention is designed to render wooden structures fire-proof, and to protect them from the action of the water and of the weather. It is also designed to be used as a paint, instead of white-lead paint.

To manufacture this composition, I mix china-clay, oyster-shell lime, borax, and litharge, in the following proportions, viz: to every five pounds of clay, five pounds of lime, one pound of borax, and one pound of litharge. This composition having been pulverized as fine as possible, and thoroughly intermingled, is mixed with boiled linseed oil till it attains the proper consistency. If desired for fire or water-proof cement, it should be mixed to the consistency of paste; if for paint, more oil will be required.

Ordinary clay or lime may be used, but the composition will then be inferior in quality both as a cement and as a paint. I design using, for practical purposes, the purest quality of china-clay and shell lime. I do not wish, however, to limit myself to these, but desire to be at liberty to use other qualities of clay and lime in their stead.

Having thus described my invention, what I claim as new therein, and desire to secure by Letters Patent, is—

The composition above described, when compounded and used substantially as and for the purposes specified.

JOSEPH HECKEL.

Witnesses:
GEO. F. DAVIS,
MICHAEL EICHINGER.